US006778820B2

(12) United States Patent
Tendler

(10) Patent No.: US 6,778,820 B2
(45) Date of Patent: Aug. 17, 2004

(54) METHOD AND APPARATUS FOR ASSURING THAT A TELEPHONE WAGER IS PLACED WITHIN THE WAGERING JURISDICTION

(75) Inventor: Robert K. Tendler, Chestnut Hill, MA (US)

(73) Assignee: Tendler Cellular, Inc., Boston, MA (US)

( * ) Notice: Subject to any disclaimer, the term of this patent is extended or adjusted under 35 U.S.C. 154(b) by 617 days.

(21) Appl. No.: 09/765,744

(22) Filed: Jan. 19, 2001

(65) Prior Publication Data

US 2002/0098829 A1 Jul. 25, 2002

(51) Int. Cl.[7] .............................................. H04M 3/16
(52) U.S. Cl. ............................. 455/414.2; 455/456.1; 455/456.3; 463/29; 463/41; 705/37
(58) Field of Search .......................... 455/414.1, 414.2, 455/440, 456.1–456.6, 457; 463/16, 29, 40, 41; 380/251, 258; 705/1, 37

(56) References Cited

U.S. PATENT DOCUMENTS

| 5,768,382 | A | * | 6/1998 | Schneier et al. .............. 380/23 |
| 5,999,808 | A | * | 12/1999 | LaDue ....................... 455/412 |
| 6,104,815 | A | * | 8/2000 | Alcorn et al. ............... 380/251 |
| 6,212,392 | B1 | * | 4/2001 | Fitch et al. ............... 455/456.2 |
| 6,259,932 | B1 | * | 7/2001 | Constien ................... 455/556.1 |
| 6,402,614 | B1 | * | 6/2002 | Schneier et al. ............... 463/17 |
| 2002/0065120 | A1 | * | 5/2002 | Lee ................................ 463/6 |

* cited by examiner

Primary Examiner—William Trost
Assistant Examiner—Stephen M D Agosta
(74) Attorney, Agent, or Firm—Robert K. Tendler

(57) ABSTRACT

A wireless phone is provided with a GPS receiver and a system which is utilized to report the local position of the wireless phone either prior or during to the time of a telephone placed wager, in which the geographic coordinates of the phone are transmitted to the sports bet for verification that the wager is being placed within the geographic limits of the wagering authority. In one embodiment spoofing of the system is prevented by having the wireless phone report the time since last fix such that an individual within the wagering authority's jurisdiction cannot remove himself from the jurisdiction with the location having been remembered, with the wager taking entity processing as valid only those geographic coordinates having a time since last fix of, for instance, ten minutes. Anything over this pre-determined limit is determined to be an invalid wager. So accurate is GPS that additional anti-spoofing is provided at the wager taking entity in which authorization is withheld if the location reported is identical to a previously reported location. Further anti-spoofing is provided by the phone transmitting its mobile identification number, with authorization for the wager occurring only for a pre-authorized mobile identification number.

8 Claims, 3 Drawing Sheets

METHOD AND APPARATUS FOR ASSURING THAT A TELEPHONE WAGER IS PLACED WITHIN THE WAGERING JURISDICTION

FIELD OF INVENTION

This invention relates to telephone wagering and more particularly to a system for preventing false indications of wagering location.

BACKGROUND OF THE INVENTION

Las Vegas and other locations within the state of Nevada have long been known for providing a sports bet facility in which wagers have been placed from around the country utilizing either wireline or wireless telephones. While an individual can go to Nevada and while physically in the sports bet place a wager, much of the business for the sports bet of each of the casinos comes from telephone wagering.

Recently the Nevada Gaming Commission has required authorization for telephone wagering by insisting that the location of the wagering party and thus the wager be within the state of Nevada. Originally it was thought that by utilizing the caller ID function of the phone that it could be understood that a call was coming from within the state of Nevada. However it was soon found that by so called call-forwarding a person, for instance, in New York City could call forward his call through a local telephone within the state of Nevada, with the caller ID indicating the in-state wire line telephone.

Telephone wagering has become increasing difficult to police due to the existence of wireless phones. Wireless phones can make calls from anywhere to the sports bet, with the result being that a wager can placed from outside the state of Nevada quite easily.

After the Nevada Gaming Commission issued a requirement for a secure system to ascertain that all telephone bets were placed within the state of Nevada, various solutions were proposed involving a complicated infrastructure and phone call tracing, with one of the solutions being qualified by the Nevada Gaming Commission. However, over the period of a year in which the system has been approved it has been consistently spoofed so that the wager appears to have been placed within the state of Nevada when it is not.

The above-mentioned system was thought to be secure because of the wire line nature of the transmission of the transmission of the call and because it was thought that it could be ascertained if the telephone making the call was not within the state.

The situation is of course more difficult with wireless calls due to the fact that wireless phones are not at a predetermined or given location. Thus the whereabouts of a wireless caller cannot be easily ascertained. While it was thought that determining the cell site which picked up the wireless call might in fact be an indication of where the wireless caller was, on the borders of Nevada it is possible to place calls from outside of Nevada and still pick up a cell site within the state of Nevada. Moreover, relay stations equivalent to the call-forwarding caller ID spoofing mentioned above, apply equally well to a wireless call in which a wireless call is placed and forwarded through a landline phone within the state of Nevada.

SUMMARY OF THE INVENTION

In order to provide a spoof proof system for ascertaining that a wagerer is within a given jurisdiction, in the subject invention a wireless phone is provided with a GPS receiver, the output of which is the latitude and longitude of the wireless phone. This information is wirelessly transmitted to the sports bet along with an indication, in one embodiment, of the time since last fix. In these phones the location is memorized for the times when the satellites are not in view. Indicating a time since last fix gives the gambling authority the opportunity to ascertain that an individual is within the boundaries of the gaming authority if the fix is for instance less than ten minutes old. This prevents the problem of someone taking the phone physically to Nevada and then removing it to a more convenient location, with the Nevada location having been memorized by the phone.

In one embodiment, the location is wirelessly transmitted through the utilization of DTMF or touch-tones which are transmitted over the voice channel, the same channel that is utilized to place the wager. These signals are decoded by a DTMF decoder at the sports bet and the location of the phone is detected along with the time since last fix. This location is compared with all of the known locations within the jurisdiction and if within the jurisdiction, then the wager is allowed to proceed. Moreover, and for more security if the present location is identical to a past location, authorization is withheld. This is effective because GPS location now has pinpoint accuracy and moving by as little as a foot causes a different latitude and longitude to be transmitted. If latitude and longitude is transmitted in hundredths of minutes, then such a small change can be detected, whereas if the latitude and longitude is merely memorized and the phone is removed, the memorized position will be transmitted and will be the same as a previously reported position.

Additional security is obtained by transmitting the phone's mobile identification number (MIN) to the sports bet.

While the subject invention is described in connection with the Nevada Gaming Commission and its rules, the application to wagering applies regardless of the jurisdiction.

What is therefore supplied is a GPS-based system in which GPS location of the phone making the wager is transmitted to the entity taking the wager, the entity taking wager then ascertaining whether or not the wager has been placed within its geographic boundaries by comparing the GPS-determined location of the phone to all known locations within the geographic boundaries of the wagering authority. In one embodiment, this is accomplished through a simple bounding algorithm in which the boundaries of the wagering authority are known and in which all the locations within that boundary are reported as valid.

In summary, a wireless phone is provided with a GPS receiver and a system which is utilized to report the local position of the wireless phone either prior or during to the time of a telephone placed wager, in which the geographic coordinates of the phone are transmitted to the sports bet for verification that the wager is being placed within the geographic limits of the wagering authority. In one embodiment spoofing of the system is prevented by having the wireless phone report the time since last fix such that an individual within the wagering authority's jurisdiction cannot remove himself from the jurisdiction with the location having been remembered, with the wager taking entity processing as valid only those geographic coordinates having a time since last fix of, for instance, ten minutes. Anything over this pre-determined limit is determined to be an invalid wager. So accurate is GPS that additional anti-spoofing is provided at the wager taking entity in which authorization is withheld if the location reported is identical to a previously reported location. Further anti-spoofing is provided by the phone transmitting its mobile identification number, with authorization for the wager occurring only for a pre-authorized mobile identification number.

BRIEF DESCRIPTION OF THE DRAWINGS

These and other features of the subject invention will be better understood taken in connection with the Detailed Description in conjunction with the Drawings, of which.

DETAILED DESCRIPTION

Figure 1:
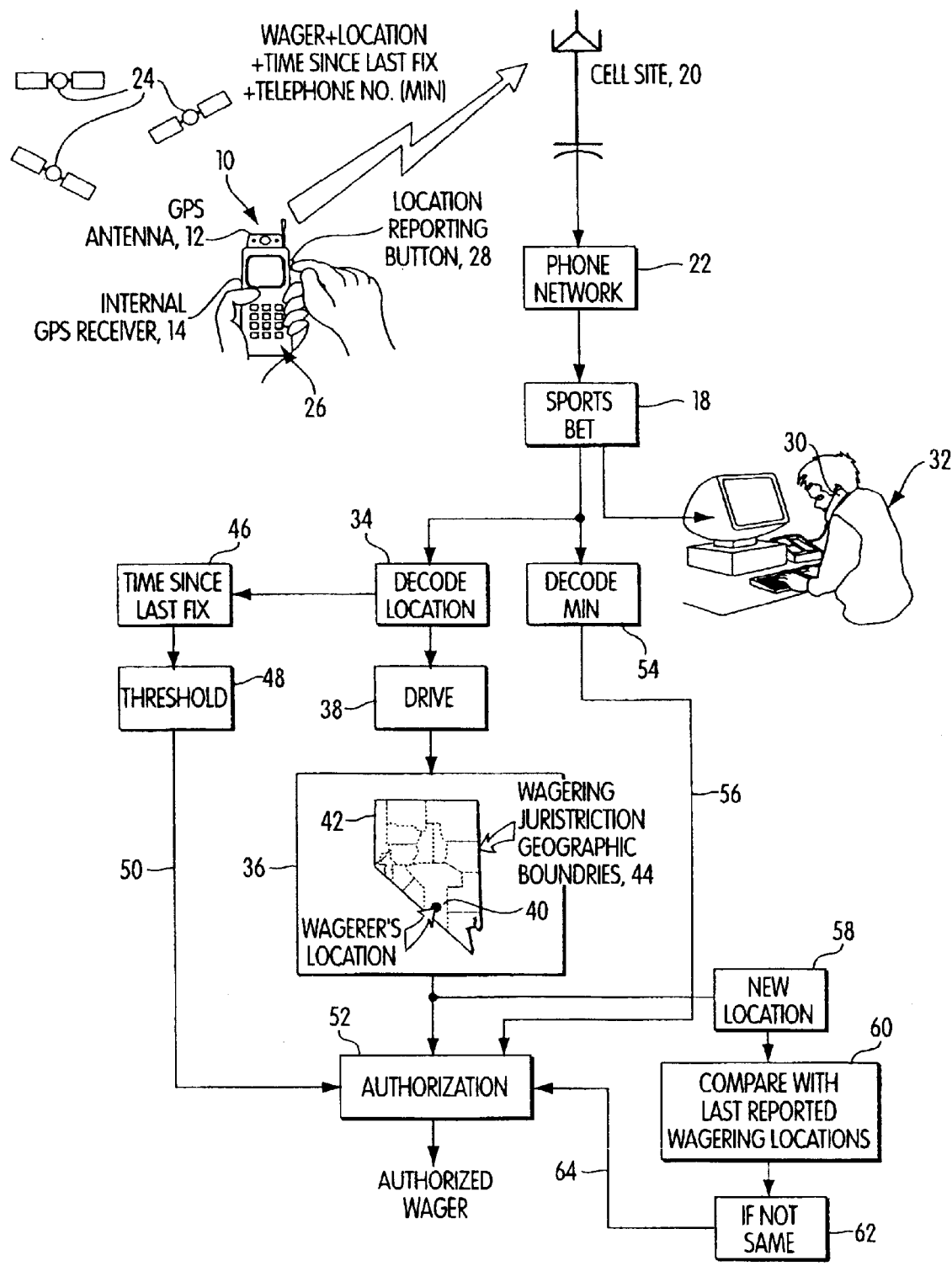
FIG. 1 is a diagrammatic representation of a secure wager placement system in which the location of the individual placing the wager is ascertained at a wireless handset, with the position being transmitted to a sports bet at which it is ascertained if the wagering individual is within the authorized territory.

Referring now to FIG. 1, in order to provide for a spoof-proof system for providing a telephone wager, a wireless handset 10 is provided with a GPS antenna 12, an internal GPS receiver 14 and a means which will be described to transmit the location determined by the GPS receiver to a sports bet 18 over a wireless network including a cell site 20 and a land line phone network 22.

The GPS-receiver receives signals from GPS satellites 24, which are in view of the GPS receiver on a line of sight basis.

With Selective Availability turned off, the accuracy of the position determined by the GPS receiver is in the 3-meter range which locates the wireless caller, here illustrated at 26 to hundredths of minutes.

In order to place a bet, an individual 24, in one embodiment, keys in the telephone number of the sports bet on keypad 26. When prompted to do so, he presses a location reporting button 28 and the location of the wireless transceiver is reported to the sports bet.

On board the wireless phone is a unit which calculates the time since last fix, as well the location. Also transmitted is the telephone number of the wireless phone (MIN) or some synthetic number identifying the wagering individual.

The telephone number is the first step in authorizing a wager to be placed, as the individual must sign up with the sport bet, giving the sports bet his or her telephone number.

Thereafter, a facility at the sports bet, decodes the location information, the time since last fix information and the mobile identification or telephone number in order to determine whether or not the wager is authorized.

The wager itself is reported over the voice channel via a telephone 30 at the sports bet in which a call taker 32 ascertains the particulars of the wager.

In order to ascertain whether or not the wagering party or individual is within the authorized geographic location, for instance, the state of Nevada, the location is decoded at 34 and a map 36 is driven by a drive unit 38 so as to indicate the location of the caller as indicated by 40 on a map 42 which has an outline of geographic boundary of the wagering jurisdiction as illustrated at 44.

Also ascertained is the time since last fix by a unit 46, which if the time is less than some pre-determined threshold 48, provides a signal over line 50 to an authorization unit 52 indicating that the location is within the prescribed time limit. Also detected is the mobile identification or MIN at 54, which is also coupled to the authorization unit over line 56.

In order to keep an individual from spoofing the system by merely having the system acquire the satellites within the designated geographic area at one time and then removing the phone out of state, it is important to be able to ascertain if the individual has moved from the area. The new reported location is established at 58 and is compared at 60 with prior or last reported locations.

It will be appreciated that the accuracy of the GPS location is good to at least one or two decimal points and that by merely moving the transceiver only a foot will result in a different latitude and longitude location being reported. If the latitude and longitude indicated by the new location unit is not identical to that previously reported, this fact is indicated at 62 and is supplied to authorization unit 64 as part of the authorization process.

In order for an authorization to be indicated and the wager authorized, the latitude and longitude must be ascertained as being within the prescribed boundary. The time since last fix must be less than pre-determined time limit, the mobile identification number must be that which is already been authorized, and the new location must not be the same as the previous stored location.

The result is that subject system is virtually spoof proof and therefore will comply with the wagering authorities rules so that the bet can be placed.

Figure 2:
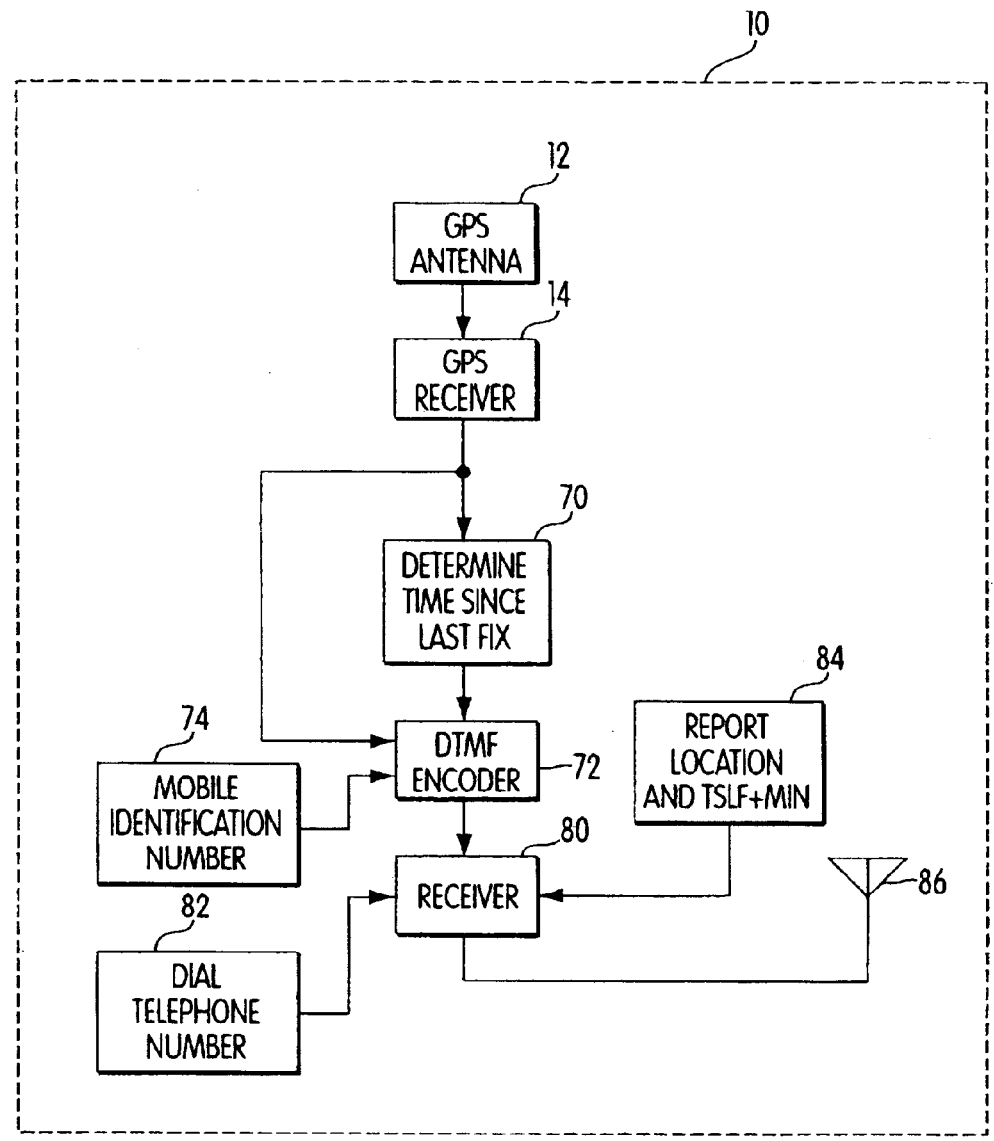
FIG. 2 is a block diagram of a wireless phone including a GPS antenna, a GPS receiver, a unit to determine time since last fix, a DTMF encoder and a unit to initiate the report of position as well time since last fix to a predetermined telephone number which is dialed by the wireless phone; and, FIG. 3 is a block diagram of the authorization system utilized at the sports bet to take into account the decoded latitude and longitude, the decoded time since last fix, the MIN of the wireless phone and a prior record of latitude and longitude received by the sports bet, so as to be able to authenticate the call and authorize the wager.

Referring now to FIG. 2, GPS antenna 12 is coupled to internal GPS receiver 14, the output of which is coupled to a unit 70 which determines the time since last fix (TSLF). This is coupled, in one embodiment, to a DTMF encoder 72 so as to be able to transmit the time since last fix. In addition the output of the GPS receiver is also coupled to DTMF encoder 72 so that the latitude and longitude can be broadcast in DTMF tones. Additionally, the mobile identification number, here illustrated at 74, is also coupled to the DTMF encoder so that this information can be also transmitted. The output of the DTMF encoder is coupled to a transceiver 80 which has a facility 82 for dialing a pre-determined telephone number, in this case the number of the sports bet. Once communication has been established between the sports bet and the wireless transceiver a button 84 is provided to report location, time since last fix and a mobile identification number. The output of the transceiver is coupled out through a conventional antenna 86.

Figure 3:
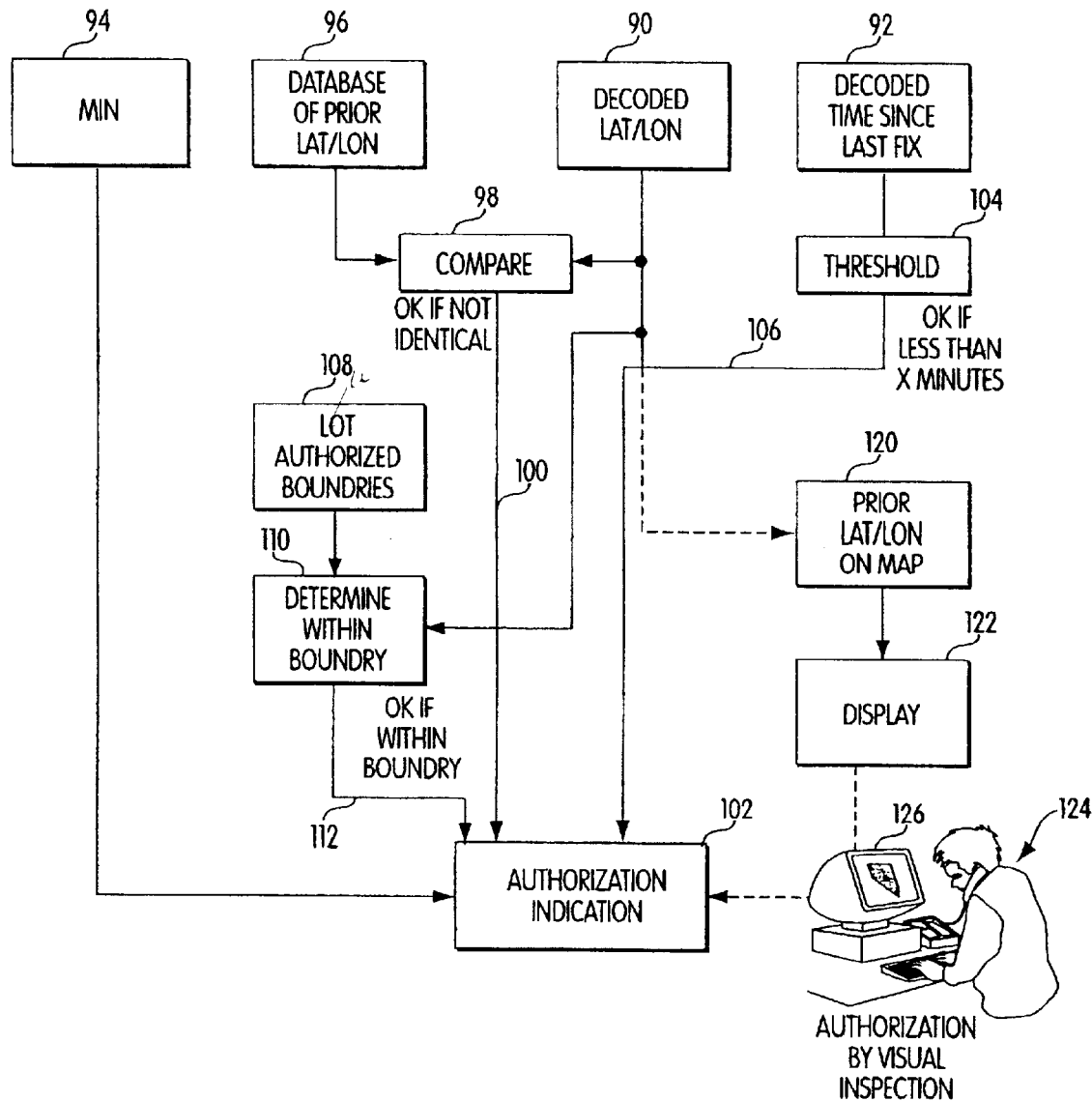

Referring now to FIG. 3, at the sports bet a DTMF decoder is utilized to decode the latitude and longitude as illustrated at 90 and to decode the transmitted time since last fix at 92 as well the mobile identification number at 94.

A data base of prior latitudes and longitudes which have been received by the sports bet is provided at 96, with the decoded latitude and longitude from unit 90 being compared with the output of database 96 via comparator 98. If not identical, comparator 98 provides a signal over line 100 to authorization indication unit 102.

The time since last fix is decoded at 92 and is provided to a threshold unit 104 which determines if the time since last fix is less than a pre-determined number of minutes. If so, a signal over line 106 is provided to authorization indication unit 102.

In order to ascertain automatically that the location of the wireless phone is within an authorized boundary a look up table 108 is provided along with a unit 110 which determines whether or not the decoded latitude and longitude from unit 90 is within the boundary established by the look up table. If within the boundary then a signal is applied over line 112 to authorization indication unit 102.

It will be appreciated that if the mobile identification number is authorized and if the location is within the indicated boundary and further that the latitude and longitude is not been priorly reported, then authorization unit 102 indicates that the wager is authorized. Alternatively for a more manual system a unit 120 is provided to plot the indicated latitude and longitude on a map which is displayed at 122 in which an individual 124 ascertains if the indicated wireless phone location is within the boundaries displayed on the map. If so, he activates a button 126 which indicates authorization that the phone is within the geographic area specified which, along with the other authorization parameters results in authorization indication and thus an allowed wager.

It will be appreciated that a the type of phone described is one which has been in U.S. Pat. Nos. 4,833,477; 5,555,286; 5,598,460; 5,649,059; 5,736,962 and 6,014,555, all issued to Robert K. Tendler and forms the basis upon which the subject system may operate.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A method for preventing unauthorized telephone wagering, comprising the steps of:

providing a wireless telephone with a geopositioning GPS receiver which enables determination of the location of the handset;

transmitting the location of the wireless telephone to an entity taking the wager;

determining from the transmitted location if the handset is within a predetermined boundary; and, authorizing the wager only if the determined position is within the predetermined boundary, said authorizing step including ascertaining the time since last fix of the receiver at the wireless telephone, transmitting the time since last fix to the entity taking the wager and authorizing a wager only if the time since last fix is less than a predetermined time.

2. The method of claim 1, wherein the boundary is the boundary of a state.

3. The method of claim 1, and further including the steps of transmitting a unique number identifying the wireless telephone and verifying that the unique number is one authorized by the entity taking the wager prior to authorization of the wager.

4. A method for preventing unauthorized telephone wagering, comprising the steps of:

providing a wireless telephone with a geopositioning receiver which enables determination of the location of the handset;

transmitting the location of the wireless telephone to an entity taking the wager;

determining from the transmitted location if the handset is within a predetermined boundary;

authorizing the wager only if the determined position is within the predetermined boundary, the geopositioning receiver storing the last location detected and transmitting this last location regardless of whether it is current; and, ascertaining if the transmitted location is not current and denying authorization of the wager if the location is not current.

5. The method of claim 4, wherein the step of ascertaining currency of the location includes the steps of determining if the transmitted location has not been valid for more than a predetermined length of time and for denying authorization of the wager responsive thereto.

6. The method of claim 4, wherein the predetermined boundary is stored in the form of a look-up table and wherein the transmitted location is compared with the stored boundary in the look-up table to ascertain if the transmitted location is within the boundary stored in the look-up table.

7. A method for preventing unauthorized telephone wagering, comprising the steps of:

providing a wireless handset with a GPS receiver which determines the location of the handset and ascertains the time since last GPS fix;

transmitting the location of the handset to an entity taking the wager;

determining from the transmitted location if the handset is within a predetermined boundary; and, authorizing the wager only if the determined position is within the predetermined boundary and only if the time since last fix is less than a predetermined time.

8. A method for preventing unauthorized telephone wagering, comprising the steps of:

providing a wireless handset with a geopositioning receiver which enables determination of the location of the handset, stores the last location and determines if the last location is current;

transmitting the location of the handset to an entity taking the wager;

determining from the transmitted location if the handset is within a predetermined boundary; and, authorizing the wager only if the determined position is within the predetermined boundary and only if the position is current or has not been current for a predetermined period of time.

* * * * *